United States Patent [19]
Borak et al.

[11] Patent Number: 6,003,340
[45] Date of Patent: Dec. 21, 1999

[54] METHOD OF PUTTING A BEND INTO A FIBER TO MAKE A STRAIN SENSOR

[75] Inventors: Georges Borak, Täby; Martin Carl Johan Kull, Vaxholm, both of Sweden

[73] Assignee: Telefonaktiebolaget LM Ericsson, Stockholm, Sweden

[21] Appl. No.: 08/716,219

[22] PCT Filed: Mar. 15, 1995

[86] PCT No.: PCT/SE95/00265

§ 371 Date: Jan. 10, 1997

§ 102(e) Date: Jan. 10, 1997

[87] PCT Pub. No.: WO95/25258

PCT Pub. Date: Sep. 21, 1995

[30] Foreign Application Priority Data

Mar. 15, 1994 [SE] Sweden .................................. 9400873

[51] Int. Cl.⁶ .................................................. C03B 37/14
[52] U.S. Cl. ........................... 65/392; 65/402; 264/1.24; 264/1.27
[58] Field of Search ............................ 65/402, 393, 392; 264/1.24, 1.27

[56] References Cited

U.S. PATENT DOCUMENTS

| | | | |
|---|---|---|---|
| 2,687,673 | 8/1954 | Boone | 264/1.24 |
| 3,779,729 | 12/1973 | Hicks | 65/410 |
| 3,977,855 | 8/1976 | Cole | 65/410 |
| 3,989,493 | 11/1976 | Barron | 65/402 |
| 4,028,081 | 6/1977 | Marcatili | 264/1.24 |
| 4,208,363 | 6/1980 | Yevick | 264/1.24 |
| 4,763,272 | 8/1988 | McLandrich | 364/468 |
| 4,808,204 | 2/1989 | Wright | 65/402 |
| 4,820,321 | 4/1989 | Presby | 264/1.27 |
| 5,132,529 | 7/1992 | Weiss | 250/227.16 |
| 5,163,988 | 11/1992 | Selaishi | 65/402 |
| 5,309,540 | 5/1994 | Turpin | 65/393 |
| 5,411,566 | 5/1995 | Poole | 65/402 |
| 5,694,497 | 12/1997 | Sansone | 385/13 |
| 5,694,512 | 12/1997 | Gonthier | 65/402 |

FOREIGN PATENT DOCUMENTS

| | | | |
|---|---|---|---|
| 185615 | 6/1986 | European Pat. Off. | 65/402 |
| 57-27211 | 2/1982 | Japan | 65/402 |
| 59-50004 | 3/1984 | Japan | 65/393 |
| 1173834 | 7/1989 | Japan | 264/1.24 |

*Primary Examiner*—John Hoffmann
*Attorney, Agent, or Firm*—Burns, Doane, Swecker & Mathis, L.L.P.

[57] ABSTRACT

An optical fiber (7) exhibits varying transmission characteristics in different strain states and can have an S-shaped microbend. For producing such a fiber it is heated locally in a small region, as viewed in the longitudinal direction of the fiber, and then the portions of the fiber (1) located at the two sides of the heated region are displaced in relation to each other in a transverse direction in relation to the longitudinal direction of the fiber. It can be performed in a conventional fusion-splicing apparatus for optical fibers. Alternatively, a laser can be used as a heating source, what is particularly suitable for processing optical fibers having longitudinal cavities in order to infer to it similar transmission characteristics. The optical fibers produced by this method are suited for use as sensors, e.g. strain gauges.

10 Claims, 3 Drawing Sheets

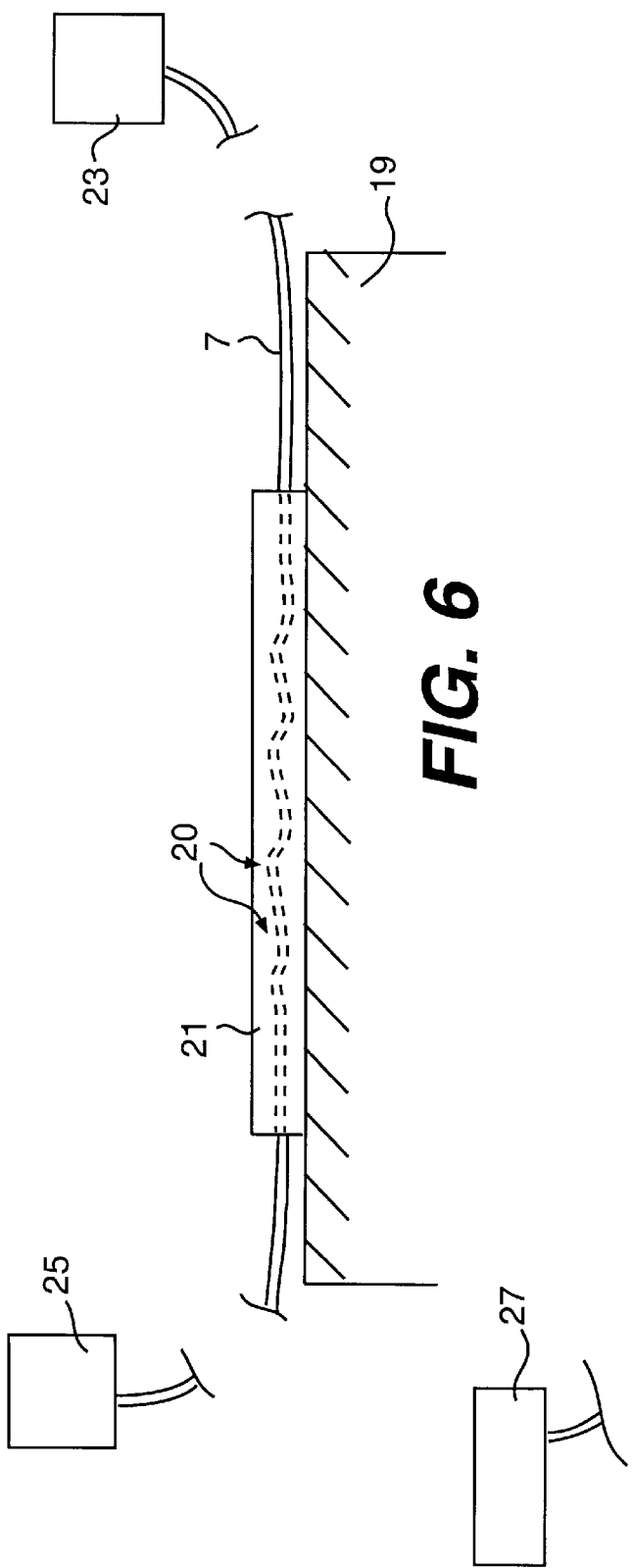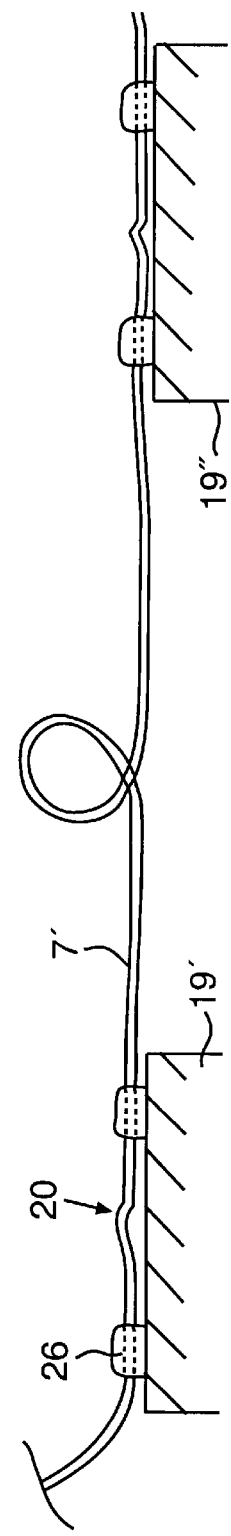

METHOD OF PUTTING A BEND INTO A FIBER TO MAKE A STRAIN SENSOR

FIELD OF THE INVENTION

The present invention relates to fiber optical strain sensors and in particular the manufacture thereof.

BACKGROUND

Optical sensors for various mechanical quantities have the obvious advantage of being insensitive to electrical interference. Strain sensors or gauges based on optical components and in particular on different kinds of optical fibers are thus suitable for measurements in the most varying environments. Also secondary mechanical quantities such as pressure, temperature, fill level and similar quantities can be measured by means of such sensors. For a strain sensor comprising a suitably designed optical fiber, further the signal can be transferred from the place of measurement to a monitoring unit through a portion of the optical fiber itself, what gives a smaller sensitivity to interference compared to electrical signal transmission.

PRIOR ART

In the patent U.S. Pat. No. 5,132,529 for Jonathan D. Weiss and the article "Fiber-Optic Strain Gauge", Jonathan D. Weiss, in Journal of Lightwave Technology, Vol. 7, No. 9, September 1989, p. 1308 and following pages, a fiber optical strain sensor is disclosed having ends 19a and 19b (the reference signs refer to the patent) rigidly attached to a substrate and a portion 16 which is not fixed and is provided with microbends. One end of the fiber is connected to a light source 13 and the other end is connected to a light detector 15. Alternatively one end can be connected to both the light source and the detector and the other end be provided with a reflector.

Further a method and a device are described for producing microbends in the optical fiber (FIGS. 2 and 3). The method comprises that the fiber is placed between two electrically heatable plates 29a and 29b provided with "forming ridges" 39, whereafter the plates are pressed against each other, so that permanent microbends are created. Preferably, plastics of optical quality is used as a material in the fiber but also commercial glass fibers of optical quality or other conventional fibers can be used.

SUMMARY

It is an object of the invention to provide simple methods, e.g. using standard apparatus, for producing fiber optical strain sensors and gauges from commercially available optical fibers.

It is another object of the invention to provide fiber optical strain sensors and gauges which, in a simple way and using standard apparatus, can be manufactured from commercially available optical fibers.

These objects are achieved by the invention, the characteristics of which are set out in the appended claims.

In order to obtain a permanent introduction of microbends in an optical fiber intended to be used as a strain sensor an optical fiber is first rigidly attached in two chucks in a fiber splicing machine, the chucks being not aligned with each other, after which the fiber is heated locally, at a cross-section thereof, by means of the electric arc of a fiber welding machine or a laser, whereby a permanent microbend is induced at the heated place of the fiber. A movement of the chucks into a state where they are not aligned can also be made during the heating, the chucks then being initially aligned. In a method for obtaining a microbend of the core in an optical longitudinal cavity fiber the longitudinal hole is closed by a local heating of the fiber, the closed state of the cavity inducing changes of the refractive index and also in most cases a microbend of the core.

Generally, an optical fiber is produced having varying transmission properties for light propagating in the fiber at different strain conditions of the fiber. The fiber can then have a region, in which is created when it is exposed to a mechanical stress, in particular a tensile stress or a compressive stress or a bending stress, a local disturbance or a local change of the refraction index adjacent the fiber core. The region can in the preferred case comprise a microbend of the core of the fiber. In the production of such a region the fiber is heated locally over a small region having an extension in the longitudinal direction of the fiber comprising not more than some fiber diameters, for instance less than 5 fiber diameters for optical quartz glass standard fibers of single mode type.

In the local heating of the fiber an electric arc in a conventional welding machine for optical fibers can be used or alternatively a laser beam having a suitably high power. Then, the region-which is influenced by the electric arc or by the laser beam respectively, extends over the whole thickness of the fiber, all around and into the fiber. Further, portions of the fiber on both sides of the heated region are displaced in relation to each other in the transverse direction, i.e. in direction essentially perpendicular to the longitudinal direction of the fiber. Then a microbend of the fiber core is created having an S-shape.

Alternatively an optical, longitudinal cavity fiber can be heated locally, the cavity in the fiber then collapsing and mechanical stresses being induced adjacent the fiber core. They cause changes of the refractive indices of the heated region and adjacent regions, which influence the transmission characteristics.

BRIEF DESCRIPTION OF THE DRAWINGS

The invention will now be described in more detail with reference to non limiting embodiments and with reference to the accompanying drawings in which FIGS. 1a and 1b schematically illustrate the production of a microbend by means of a conventional automatic fiber welding machine, FIG. 2 schematically shows a microbend obtained in a conventional optical fiber, FIG. 3 schematically shows a microbend obtained in an optical fiber having double cores, FIG. 4 schematically shows how a microbend can be obtained in a longitudinal cavity fiber, FIG. 5 schematically shows a longitudinal cavity fiber having a microbend of the core obtained therein, FIG. 6 schematically shows an optical strain sensor attached to a substrate, the st rain of which is to be measured, FIG. 7 schematically shows an optical fiber having microbends and used to detect, by means of the same fiber piece, the strains of two different objects.

DETAILED DESCRIPTION

Figure 1A:
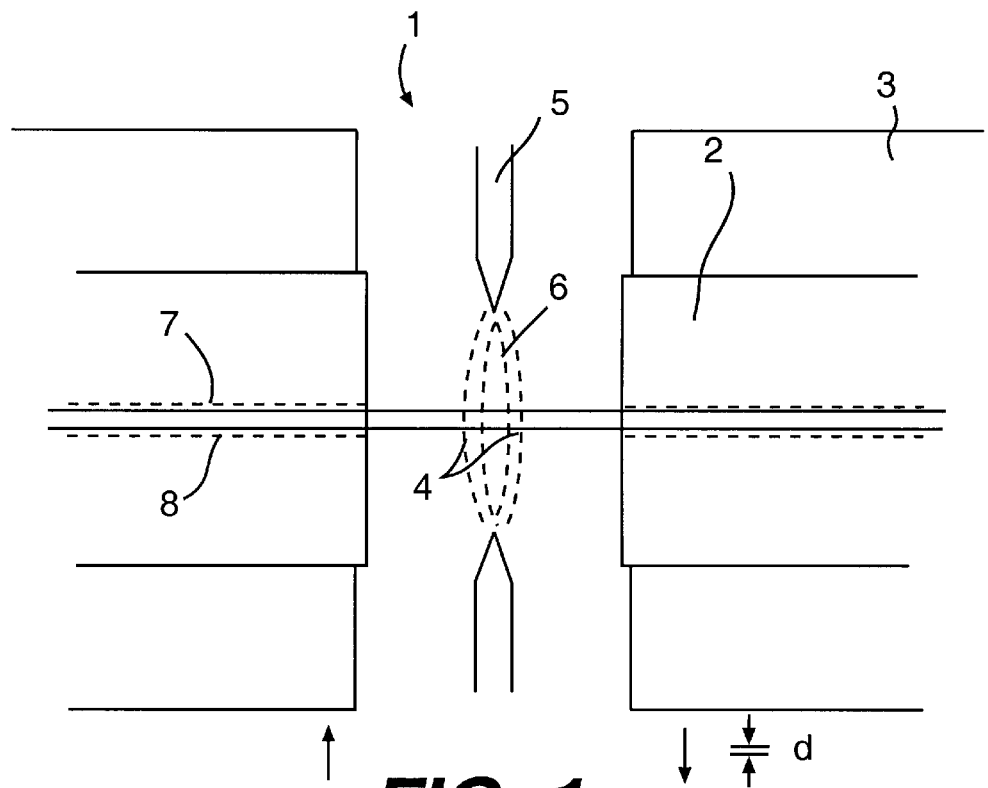

In FIG. 1a it is schematically illustrated, as viewed from the side or from the top, the central parts of a conventional fiber splicing machine 1. The splicing machine 1 has plates or chucks 2 which are attached to retainers 3, which can be displaced, by not shown mechanisms and driver devices, generally in three coordinate directions in relation to each other. Further there are electrodes 5 connected to a voltage source, not shown, for generating an electric arc 6 between the points of the electrodes 5. The electric arc 6 passes through a region centrally located between the chucks 2, in the conventional case for heating the ends of two optical fibers which are to be welded to each other.

For production of a strain sensor a single conventional optical fiber 7, for instance a quartz glass fiber, is placed in the two chucks 2, so that the fiber passes in the space between the chucks 2 and through the region between the points of the electrodes 5, where the electric arc 6 is generated. The chucks 2 contain, as is conventional, guides indicated at 8 for the optical fibers which are to be fusion welded or only heated, and they can, in an initial state in the method discussed here, be placed opposite and aligned with each other, so that the optical fiber 7 passes from one chuck to the other without essentially any bending thereof. An electric arc 6 is then generated between the points of the electrodes 5 and it will heat a region of the optical fiber 7 centrally located between the front sides or end surfaces of the chucks 2. This region is rather local, as seen in the longitudinal direction of the fiber, and can comprise for instance about 5 fiber diameters at most for standard fibers of single mode type. The heating is made all around the whole fiber 7 and penetrates rapidly into the inner portions of the fiber 7.

Figure 2:
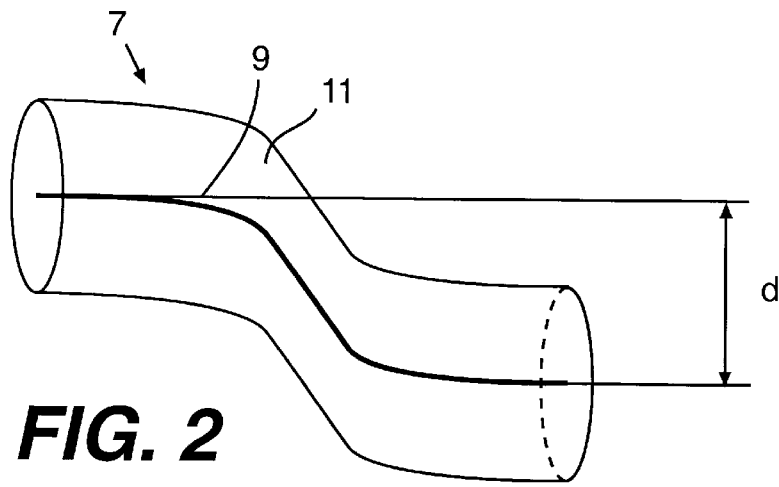

When the heating is sufficient, so that the glass in the optical fiber 7 within the locally heated Region is suitably soft or semimelted, the retainers 3 are displaced a distance d laterally in relation to each other and hereby, also the chucks 2 are displaced the same distance d laterally in relation to each other. Owing to the rigidity of the not heated free portions of the fiber 7 and the softness of the heated region it will produce a bending of S-type of the optical fiber, as is schematically illustrated in FIG. 2. After this heating and the displacement of the retainers 3 in relation to each other, the current supply to the electrodes 5 is discontinued, whereby the electric arc 6 disappears. The optical fiber 7 has now got a permanent bend induced which is of the type illustrated in FIG. 2.

Figure 1B:
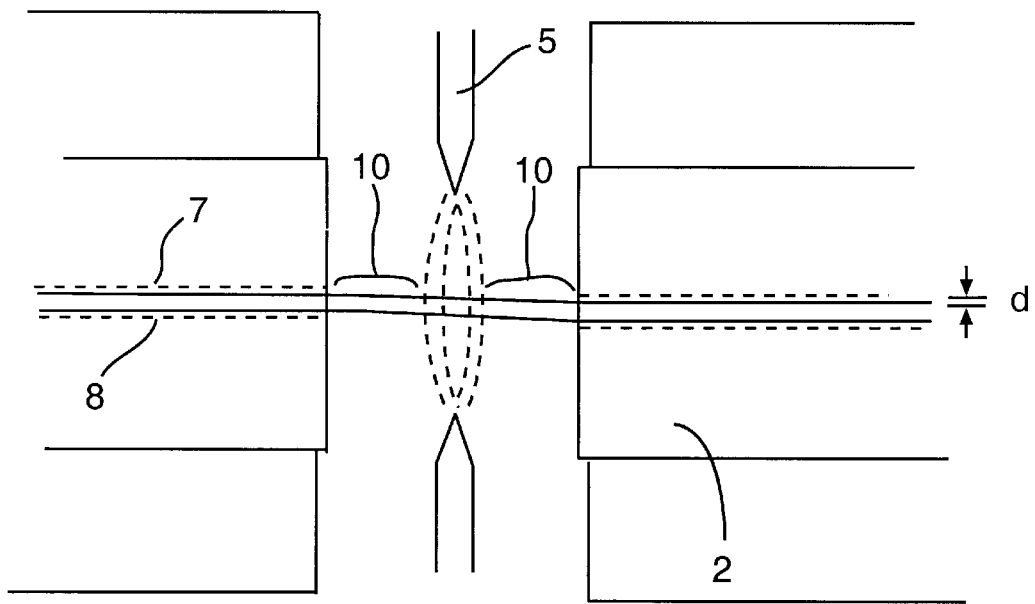

A preferred alternative of this production method is illustrated in FIG. 1b. Here the guides 8 in the chucks 2 are initially displaced the distance d from an aligned state, after which the optical fiber 7 is positioned in the guides 8, so that it extends from one chuck 2 to the other one. A weak bending of the fiber is then obtained in the region between the end surfaces of the chucks 2. Thereafter a suitable electric high voltage is supplied to the electrodes 5 for creating an electric arc in the same way as above. Hereby a region of the fiber 7 is heated locally as above and becomes soft and plastic. Owing to the elasticity of the not heated region of the optical fiber 7 the fiber portions between the heated region 4 and the end surfaces of the chucks 2 are straightened out in order to be aligned with the adjacent portion of the fiber in the respective chuck 2, whereby the material in the heated region 4 is bent to the same shape of S-type as is illustrated in FIG. 2.

The produced microbend of an optical fiber 7 illustrated in FIG. 2 is characterized by the fact that the bend consists of two arcs or curved segments composed to an S-like shape, so that the portions of the fiber 7 outside the heating region are essentially parallel to each other but displaced laterally approximately the distance d. The core 9 of the fiber 7 and the surface of the fiber cladding 11 has essentially the same profile. In the production of the microbends according to FIG. 2, the fiber is heated, as has been stated above, over a region in its longitudinal direction having a length corresponding to some multiple of the diameter of the cladding of the fiber 7, for instance longer than a fiber diameter and shorter than about 5 fiber diameters. The parallel displacement d of the optical fiber has the magnitude of order of one or a few fiber diameters at most, for instance less than three times the fiber diameter, in the preferred case less than 1 fiber diameter, in the range comprising 0.5–1 fiber diameter.

Figure 3:
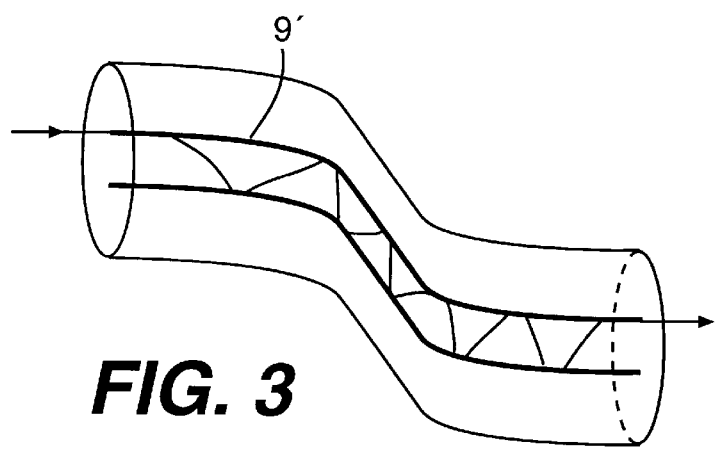

An optical fiber having double cores comprises two parallel cores which extend close to each other and are enclosed by the same cladding. If the cores have the same geometry and are located adjacent each other, light can be coupled between the two cores. Such a fiber can be bent in the same way as the fiber illustrated in FIG. 2 and is illustrated in FIG. 3. Here the bend is made in a suitable direction in relation to the plane passing through the two fiber cores 9'. The bend can advantageously be made so that the fiber cores 9' after this bending will extend in the same plane. The optical characteristics of the two cores are then changed and the coupling of light between the two cores is thereby changed.

The method described above for producing a microbend in an optical fiber can also be used for other fibers, for instance a longitudinal cavity fiber 7'. Such a fiber is illustrated schematically in FIG. 5 and comprises a longitudinal cavity 13 extending inside the fiber cladding 11 in parallel to the fiber core 9. In order to make a microbend of a cavity fiber 7' also the device schematically illustrated in FIG. 4 can be used. Here a carbon dioxide laser is arranged producing a light beam 17 which is made to locally heat an optical longitudinal cavity fiber 7'. When the material, which is located in the cladding of the fiber 7' around the cavity 17, is heated locally, it collapses, so that the cavity is not preserved within a portion of the heated region. When the material collapses no visible bend of the cladding 11 of the fiber 7' is formed but instead a microbend of the fiber core 9 is produced which is visible at 17 in FIG. 5. The microbend of the core is rather small and the parallel displacement of the core comprises a fraction of the radius of the fiber core, typically having the magnitude of order 0.1 of the core diameter for an optical standard fiber having a core diameter of about 10 $\mu$m and generally for instance not more than 0.3 of the core diameter. Also, a heating without any parallel displacement of the retainers 3 or the chucks 2 in an ordinary welding machine of the type shown in FIG. 1 can produce a corresponding local heating of the fiber causing thereby a corresponding collapsing or closing of the longitudinal cavity 13 passing through the heated region.

When the fibers 7, 7', which are described above and which have microbends produced therein of at least the core 9 of the fiber, are subjected to a change of their lengths, i.e. a strain, the geometrical conditions of both the core and the cladding are changed, for instance by a straightening of the microbend, and further a change is obtained of the distribution of the refractive index in the core 9 and the cladding 11. For a strain of an optical fiber having double cores with microbends according to FIG. 3, the bend may for instance be straightened so that the ratio of tensile stress and compressive stress is reduced resulting in a change of the coupling of light between the two cores.

Figure 4:
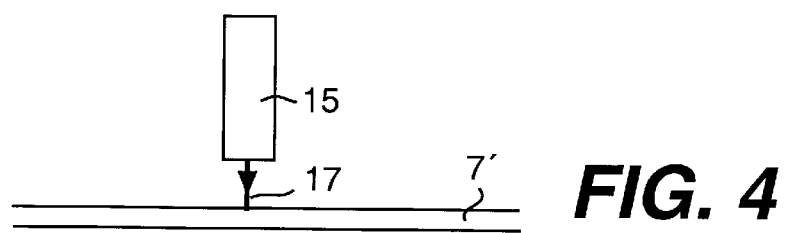
Figure 5:
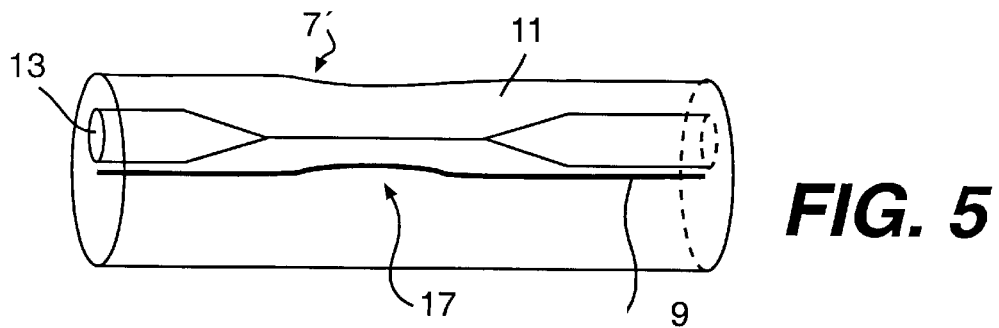

In the collapsing or closing of the cavity of a longitudinal cavity fiber according to FIGS. 4 and 5 it may in extreme cases occur, that no visible bend of the fiber core 9 is obtained. The cavity fiber can still, when it is subjected to a strain, give changed refractive indices in the region adjacent the fiber core 9 and this effect can be detected.

A schematic picture of the use of an optical fiber 7 for measurement of the strain of a substrate or support 19 is shown in FIG. 6. A piece of a fiber 7 treated as above, for instance having a multitude of microbends 20, is moulded to and rigidly attached to the support 19 by means of an adhesive layer 21 of a plastics material, for instance a thermosetting adhesive such as an epoxy adhesive. In applying the adhesive care should be taken that the layer between the fiber 7 and the surface of the substrate 19 is as thin and as rigid as possible, in order to produce a direct transfer of strains of the support to the fiber. The ends of the optical fiber 7 are connected to suitable detection devices. In the case shown an equipment for transmission measurement is used and it can then comprise a light source 23 and a light detector 25. From the light source 23 light having a suitable wave length is issued through the fiber 7 and the transmitted light is measured by the light detector 25. By arranging, as is illustrated in FIG. 6, several microbends close to each other at a spacing of for instance about 1 mm an increased sensitivity is obtained when the region having microbends is subjected to a strain.

Also other detection methods can be used. Such an arrangement is shown in FIG. 7, where two regions of a fiber 7' having microbends 20 of the core have been placed attached to two different supports 13'. In this case each region is attached to the respective support by means of adhesive bumps or some other mounting means 27 at each sides of the region having a microbend 20, so that the region having the microbend is free from, detached from the substrate. One end of the fiber is connected to an OTDR instrument 27 operating both as a transmitter and receiver of light. The receiver part can detect the magnitude of received light and distinguish backwards diffused light from different points of the optical fiber 7' and in particular from the two microbends 20. Thereby the strain of each one of the two substrates 19' and 19" can be determined.

What is claimed is:

1. A method of manufacturing an optical fiber having transmission characteristics responsive to different strain states of the optical fiber for a fiber optical strain sensor, the method comprising the sequential steps of:

providing an optical fiber having a substantially straight shape;

retaining the optical fiber at two retained regions with a free region between the two retained regions and with the optical fiber extending rectilinearly throughout the retained regions and the free region;

heating the optical fiber locally over only a first portion of the free region to make the first portion soft, non-heated second portions of the free region extending from the retained regions and connected to or surrounding the first region and all non-heated regions of the optical fiber having a rigidity or elasticity:

while locally heating the optical fiber, displacing the retained regions laterally relative to one another to make the non-heated second portions of the free region connected to or surrounding the soft first portion also be displaced laterally in a parallel way by the rigidity or elasticity of the non-heated regions to produce a bend of the optical fiber in the first portion; and allowing the optical fiber to cool.

2. The method according to claim 1, wherein the heating step is performed to soften the optical fiber over a whole thickness of the optical fiber in the first portion.

3. The method according to claim 1, wherein the first portion has a length not more than five fiber diameters.

4. The method according to claim 1, wherein the heating step is performed by an electrical arc.

5. The method according to claim 1, wherein the heating step is performed by a light beam having an intensity sufficiently high to soften the optical fiber.

6. The method according to claim 5, wherein the light beam is produced by a laser.

7. The method of claim 1, wherein the first portion has a length not less than one fiber diameter.

8. The method of claim 1, wherein in the step of displacing the retained regions the retained regions are displaced laterally by a distance less than three fiber diameters.

9. The method of claim 1, wherein in the step of displacing the retained regions the retained regions are displaced laterally by a distance less than one fiber diameter.

10. The method of claim 1, wherein in the step of displacing the retained regions the retained regions are displaced laterally by a distance more than half a fiber diameter.

* * * * *